(12) United States Patent
Le Gouriellec et al.

(10) Patent No.: US 7,133,360 B2
(45) Date of Patent: Nov. 7, 2006

(54) CONDITIONAL BANDWIDTH SUBSCRIPTIONS FOR MULTIPROTOCOL LABEL SWITCHING (MPLS) LABEL SWITCHED PATHS (LSPS)

(75) Inventors: Louis Le Gouriellec, Nantes (FR); Guy Erb, Spokane, WA (US); Dennis Weaver, Spokane, WA (US)

(73) Assignee: Alcatel, Paris (FR)

( * ) Notice: Subject to any disclaimer, the term of this patent is extended or adjusted under 35 U.S.C. 154(b) by 995 days.

(21) Appl. No.: 10/139,983

(22) Filed: May 7, 2002

(65) Prior Publication Data

US 2003/0112756 A1    Jun. 19, 2003

Related U.S. Application Data

(60) Provisional application No. 60/341,647, filed on Dec. 17, 2001.

(51) Int. Cl.
*G01R 31/08* (2006.01)

(52) U.S. Cl. .................. 370/229; 370/235; 370/412; 370/468

(58) Field of Classification Search .................. None
See application file for complete search history.

(56) References Cited

U.S. PATENT DOCUMENTS

| | | | |
|---|---|---|---|
| 6,661,802 B1* | 12/2003 | Homberg et al. ............ 370/412 |
| 6,901,052 B1* | 5/2005 | Buskirk et al. ............. 370/235 |
| 6,934,250 B1* | 8/2005 | Kejriwal et al. ............ 370/229 |
| 7,006,440 B1* | 2/2006 | Agrawal et al. ............ 370/235 |

OTHER PUBLICATIONS

Floyd, Sally et al.; *Random Early Detection Gateways for Congestion Avoidance*; IEEE/ACM Transactions on Networking, vol. 1, No. 4; Aug. 1993; pp. 397-413.
Rosen, E. et al.; *Multiprotocol Label Switching Architecture*; http://www.ietf.cnri.reston.va.us/rfc/rfc3031.txt?number=3031; Network Working Group, Request for Comments: 3031; Jan. 2001; 53 pp.

* cited by examiner

*Primary Examiner*—Duc Ho
(74) *Attorney, Agent, or Firm*—Craig A. Hoersten; V. Lawrence Sewell (57) ABSTRACT

A method and system for providing conditional bandwidth subscriptions to MPLS LSPs. Traffic is policed and/or marked at an ingress node to ensure that traffic that exceeds the LSP's conditional bandwidth is dropped. Traffic above the LSP's committed bandwidth but below the LSP's conditional bandwidth is admitted but marked as suitable for discarding. All traffic below the LSP's committed bandwidth is admitted. A queuing mechanism at each node of the LSP helps ensure that committed bandwidth traffic is protected during periods of congestion. Each node maintains a queue with a first area reserved for periods of congestion and a second area reserved for periods of no congestion. When congestion is encountered, unmarked traffic is stored in the first area and marked traffic is discarded. When no congestion is encountered, both marked and unmarked traffic is stored in the second area.

24 Claims, 7 Drawing Sheets

CONDITIONAL BANDWIDTH SUBSCRIPTIONS FOR MULTIPROTOCOL LABEL SWITCHING (MPLS) LABEL SWITCHED PATHS (LSPS)

CROSS-REFERENCE OF RELATED APPLICATION(S)

This application claims the benefit of U.S. provisional application No. 60/341,647, filed on Dec. 17, 2001, the contents of which are incorporated herein by reference.

FIELD OF THE INVENTION

This invention relates generally to controlling traffic in a data communications network, and more specifically, to a congestion control mechanism for a label switched path adhering to a multiprotocol label switching protocol.

BACKGROUND OF THE INVENTION

Recent data communications nodes often support a multiprotocol label switching (MPLS) protocol that provides a connection-oriented service that enables IP tunneling across a wide area network. Unlike the hop-by-hop, on-demand forwarding of conventional Layer 2 (e.g. bridging) and Layer 3 (e.g. routing) protocols, the MPLS protocol provides a common protocol for end-to-end switching over heterogeneous switching nodes, referred to as label switch routers (LSRs), on pre-configured label switched paths (LSPs). A label switched path is a path through an MPLS network so that when a label is applied, traffic transits multiple routers in the LSP. The MPLS protocol is described in detail in "Multiprotocol Label Switching Architecture," E. Rosen et al., Internet Engineering Task Force Request for Comment 3031, January 2001 (hereinafter referred to as RFC 3031), the content of which is incorporated herein by reference.

According to the MPLS protocol, analysis of a packet's network layer header is done only once, and not repeated in subsequent hops. In the subsequent hops, a label that is attached to the packet is used as an index into a table which specifies the next hop, and a new label. The old label is replaced with the new label, and the packet is forwarded to its next hop.

According to current MPLS LSP technology, each LSP is generally assigned a committed bandwidth. One deficiency with the assignment of a committed bandwidth for MPLS LSPs from a carrier's point of view is that it often does not appropriately allocate excess bandwidth to the LSPs during low network traffic periods and thus, makes poor usage of a network node's bandwidth.

Another deficiency is that even traffic within an LSP's committed bandwidth may often be affected during peak traffic periods. For example, if aggregate traffic accepted into a network node exceeds the node's queuing capacity, traffic within an LSP's committed bandwidth may be dropped.

Accordingly, there is a need for a system and method for controlling network traffic that helps appropriately allocate use of a network node's excess bandwidth and ensure no loss of traffic within an LSP's committed bandwidth.

SUMMARY OF THE INVENTION

According to one embodiment, the invention is directed to a method for controlling network traffic in a data communications network where the method includes receiving an inbound packet from an inbound traffic flow, identifying the packet as a first profile packet if the packet conforms to a first traffic flow profile, and identifying the packet as a second profile packet if the packet conforms to a second traffic flow profile. In one embodiment, the packet conforms to the first traffic flow profile if the packet is transmitted within a committed bandwidth subscription for the flow, and conforms to the second traffic profile if the packet is transmitted outside the committed bandwidth subscription for the flow but within a conditional bandwidth subscription for the flow. During periods of network congestion, the first profile packet is stored in an area of a queue reserved for storing first profile packets and the second profile packet is discarded. In another embodiment, during periods of no network congestion the first and second profile packets are stored in a second area of the queue.

In further embodiment, the invention is directed to a method for allocating excess bandwidth in a data communications network on a subscription basis. The method includes providing a first subscribed bandwidth and a second subscribed bandwidth to a flow, receiving a first packet transmitted below the first subscribed bandwidth, and receiving a second packet transmitted above the first subscribed bandwidth but below the second subscribed bandwidth. If network congestion is detected, the first packet is stored in a first area of a queue reserved for periods of congestion and the second packet is discarded. If no network congestion is detected, the first and second packets are stored in a second area of the queue reserved for periods of non-congestion.

In another embodiment, the invention is directed to a switching node including an input port, an output port, and a buffer coupled to the input port and the output port. The buffer includes a first area reserved for storing packets during periods of network congestion and a second area reserved for storing packets during periods of no network congestion.

In another embodiment, the committed and conditional subscriptions for a flow are signaled through the data communications network using a flow signaling protocol.

It should be appreciated, therefore, that the present invention provides a method and system for controlling network traffic that helps protect traffic within a committed bandwidth subscription for a flow. The reservation of the first area of the queue allows packets within a committed bandwidth subscription for the flow to be stored and not discarded even during periods of network congestion. If no network congestion is encountered, the method and system makes efficient use of excess bandwidth by admitting traffic up to a conditional bandwidth subscription for the flow.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION

Figure 1:
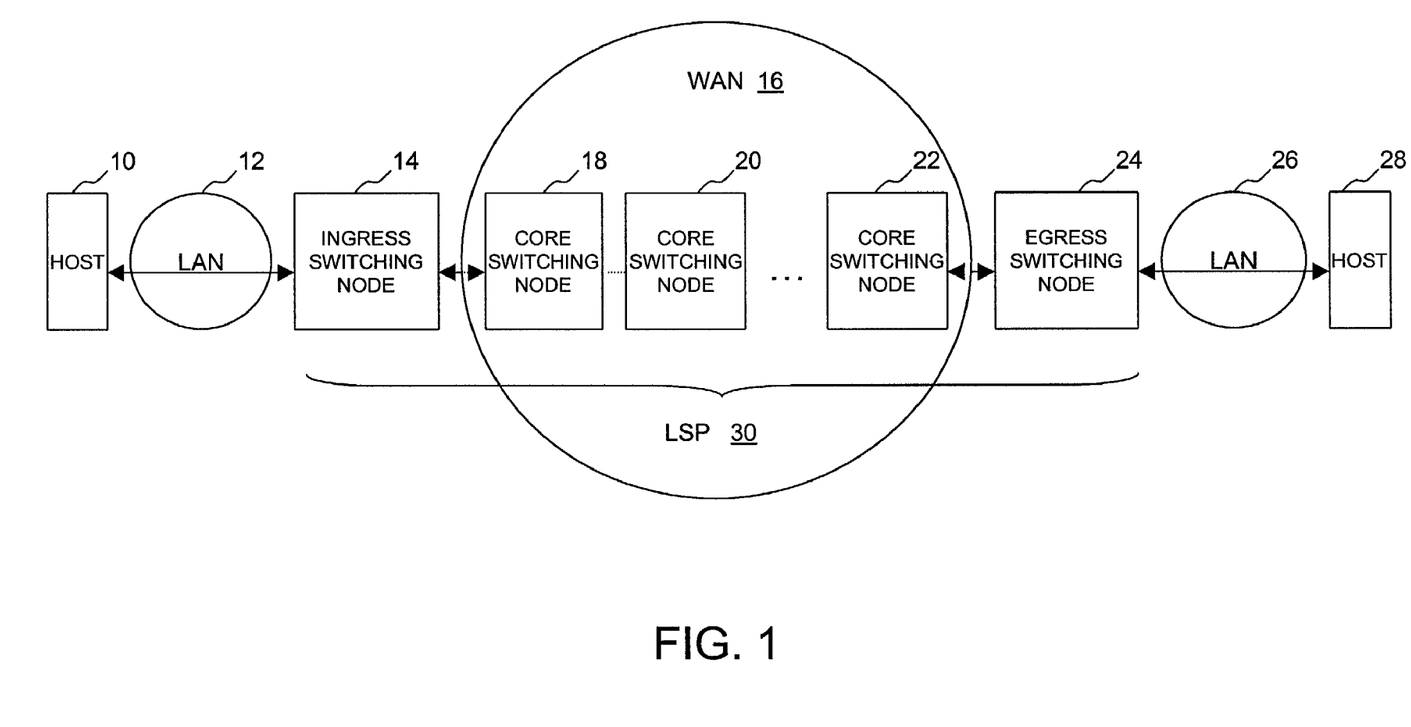
FIG. 1 is a schematic block diagram of a data communications network according to one embodiment of the invention.

FIG. 1 is a schematic block diagram of a data communications network, such as, for example, a data communications network adhering to the MPLS protocol, according to one embodiment of the invention. In the illustrated embodiment, the network includes hosts 10, 28 seamlessly receiving and transmitting data packets, also referred to as frames, over an IP tunnel, such as, for example, a label switched path (LSP) 30. The LSP may be a pre-configured IP tunnel formed from edge switching node 14 to edge switching node 24 over a wide area network (WAN) 16 via one or more core switching nodes 18, 20, 22. Although the current embodiment illustrates a single LSP 30, a person skilled in the art should recognize that each switching node 14–24 may be part of multiple other LSPs traversing the node.

The hosts 10, 28 are respectively connected to either edge switching node 14 or 24 over transmission media that may be wired or wireless. The hosts 10, 28 may be network end-stations such as, for example, personal computers, workstations, servers, or other end user devices.

The edge and core switching nodes 14–24 may be gateway devices such as, for example, switches, routers, and the like, having network interfaces for forwarding packetized communications originated by the hosts 10, 28. According to one embodiment, the edge and core switching nodes support the MPLS protocol as set forth in RFC 3031. The edge and core switching nodes are also commonly referred to as label switch routers (LSRs). Edge switching nodes 14, 24 are each commonly referred to as an ingress LSR or egress LSR depending on the direction of the flow of traffic.

The hosts 10, 28, LANs 12, 26, and edge and core switching nodes 14–24 may be interconnected via transmission media that may be wired or wireless. The hosts 10, 28, LANs 12, 26, and edge and core switching nodes 14–24 may communicate using a LAN communication medium, such as Ethernet or Token Ring, Internet Protocol (IP), and/or Asynchronous Transfer Mode (ATM). Ethernet LAN communication media are not limited to 10 megabit Ethernet, but include other variants, such as Fast Ethernet, Gigabit Ethernet, 10 Gigabit Ethernet and 802.11b wireless Ethernet.

According to one embodiment of the invention, the IP tunnel is an oversubscribed LSP 30 with a subscribed committed bandwidth and a subscribed conditional bandwidth. The subscribed committed bandwidth, also referred to as a committed rate (CR), is aimed to be always available due to end-to-end bandwidth reservation in the queues along the LSP pipe. The bandwidth reservation may be accomplished, for example, via time division multiplexing technology conventional in the art. The subscribed conditional bandwidth, also referred to as an excess rate (ER), is aimed to be statistically available via statistical multiplexing based on a real time load of the node queues along the LSP pipe.

According to one embodiment of the invention, the CR and ER subscriptions are signaled through the data communications network using a flow signaling protocol such as, for example, a resource reservation protocol extensions for traffic engineering (RSVP-TE), label distribution protocol (LDP), and/or the like. According to this embodiment, the CR and ER rates are transmitted in the signal transmitted when setting up the LSP.

In an alternative embodiment of the invention, the CR and ER subscriptions are statically configured in a customer's traffic conditioning agreement (TCA) and/or service level agreement (SLA) with a carrier.

In general terms, edge switching node 14, hereinafter referred to as the ingress switching node, engages in traffic policing and marking to control network traffic traversing the oversubscribed LSP 30. In this regard, the edge switching node 14 polices and discards packets in a traffic flow that exceeds a subscribed CR and ER. Traffic that only exceeds the CR is admitted, but marked to be discarded in case of network congestion. Traffic that does not exceed the CR is admitted without marking.

As the marked and/or unmarked traffic traverses the oversubscribed LSP, each switching node 14–24 exercises congestion control to protect the unmarked CR traffic transmitted within the LSP's committed bandwidth. If congestion in a present node queue is determined based upon its queuing capacity, the marked ER traffic transmitted within the conditional bandwidth is dropped. The unmarked CR traffic, however, is stored using the reserved CR bandwidth even during congestion.

Figure 2:
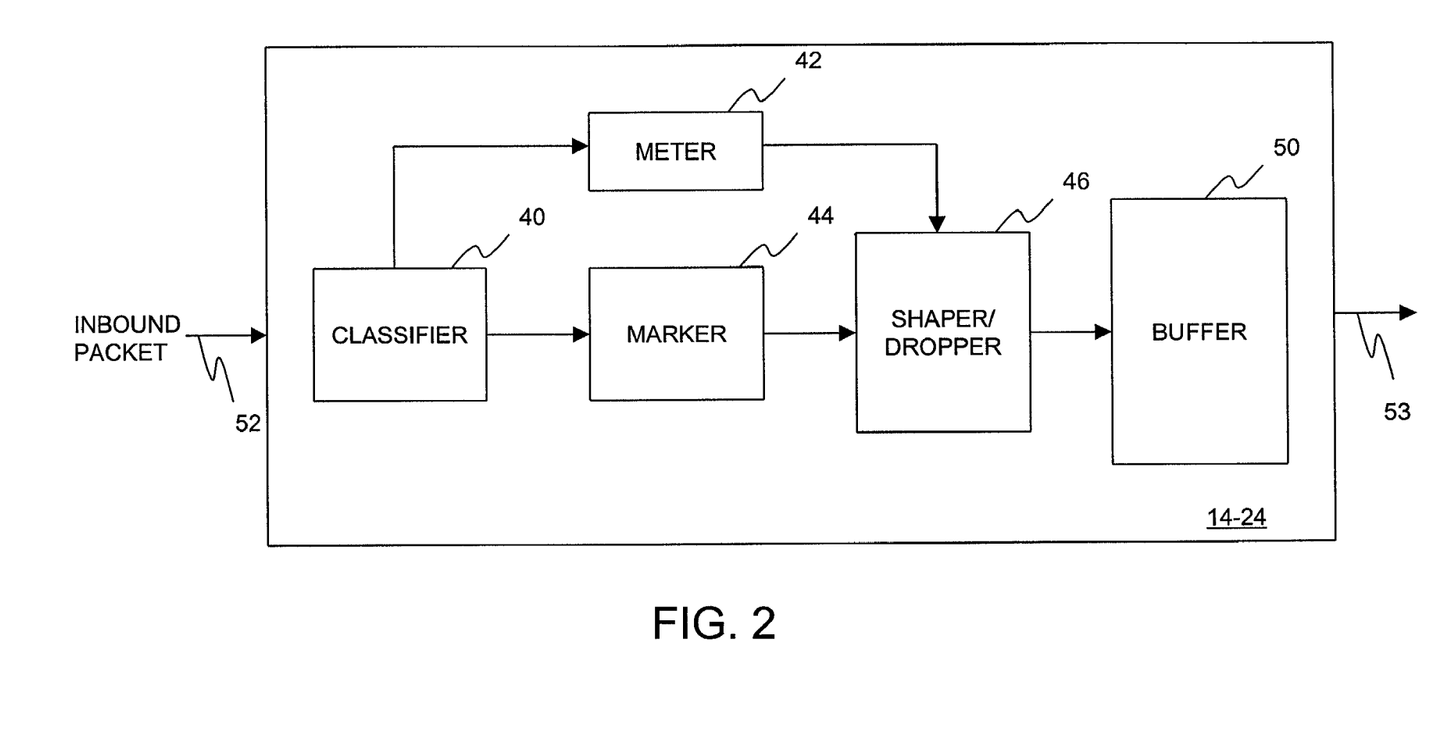
FIG. 2 is a schematic block diagram of edge and core switching nodes in a label switched path (LSP) according to one embodiment of the invention.

FIG. 2 is a schematic block diagram of the edge and core switching nodes 14–24 according to one embodiment of the invention. The nodes may include a classifier 40, meter 42, marker 44, shaper/dropper 46, and buffer 50. The meter 42, marker 44, and shaper/dropper 46 may be collectively referred to as a traffic conditioner. Traffic conditioners are logical devices that may reside in the edge switching nodes 14, 24 or alternatively, in both the edge and core switching nodes 14–24. It is understood, of course, that FIG. 2 illustrates a block diagram of the nodes without obfuscating inventive aspects of the present invention with additional elements and/or components which may be required for creating the nodes. These additional elements and/or components, which are not shown in FIG. 2 are well known to those skilled in the art.

The classifier 40 classifies inbound packets in a conventional manner based on information in the packet's header, such as, for example, source/destination addresses, port numbers, DiffServ codepoints (DSCP), and the like. The classifier, in essence, selects the traffic flows that are to receive a particular service.

The meter 42 checks traffic flow properties against a customer's traffic profiles described in the customer's TCA/SLA. The meter 42 may be any conventional meter known in the art such as, for example, an average rate meter, exponential weighted moving average meter, two-parameter token bucket meter, multi-state token bucket meter, a null meter, or the like. The meter 42 identifies packets as in-profile or out-of-profile based on the comparison with the customer's traffic profiles.

The marker 44 marks an unmarked packet or re-marks a previously marked packet based on the results of the classification and metering information. For instance, the marker sets or resets the DSCP fields of the packet.

The shaper/dropper 46 makes traffic flows conformant to the customer's traffic profile.

The buffer 50 includes an oversubscribed queue storing retained data packets according to a queuing mechanism. Traffic generated by various oversubscribed LSPs that traverse the node may be multiplexed to the same oversubscribed queue. According to one embodiment, the queue is separated into two areas. A first area, referred to as the congestion area, is reserved for storing CR traffic during periods of congestion. A second area, referred to as the non-congestion area, is reserved for storing packets during periods of non-congestion. A congestion watermark on the queue may be used to indicate a congestion status and separate the non-congestion area from the congestion area.

In general terms, the ingress switching node 14 receives an inbound traffic flow via an input port 52 and invokes the classifier 40 for classifying a packet in the flow. The classified packet is transmitted to the meter 42 for checking the traffic flow properties in light of the new inbound packet.

The marker 44 further receives the classified packet and marks the packet based on the classification information and the traffic flow information from the meter 42. According to one embodiment of the invention, all traffic above the CR but below CR+ER is marked to be dropped in case of congestion. All traffic within the CR is left unmarked. Alternatively, the traffic within the CR is marked for indicating its status as CR traffic. Throughout the description of the various embodiments, however, referring to a packet as "marked" indicates that the packet is marked as suitable for discarding unless indicated otherwise as being part of CR traffic that is not discarded.

The packet is further transmitted to the shaper/dropper 46 for determining whether to forward or discard the packet. According to one embodiment of the invention, all traffic over CR+ER is discarded. All other non-discarded traffic is passed to the buffer 50 for processing by its queuing mechanism.

According to one embodiment of the invention, the buffer's queuing mechanism determines the fullness of the non-congestion area of the oversubscribed queue. If the filling level of the non-congestion area of the queue is below the congestion watermark, a non-congestion status is indicated and all marked and unmarked packets admitted to the node are stored in the non-congestion area. However, if the filling level of the non-congestion area is above the congestion watermark, a congestion status is indicated causing all marked packets to be dropped and unmarked packets to be stored in the congestion area of the queue for transmitting via an output port 53 to a next hop on the LSP 30. The unmarked CR traffic transmitted within the committed bandwidth may therefore be protected even when congestion is encountered.

As the marked or unmarked packet traverses the various core switching nodes 18–22 and egress switching node 24 on the LSP 30, each node employs the above-described queuing mechanism for determining whether the packet is to be dropped or queued for forwarding to a next hop. In this regard, an inbound packet received by a receiving node's classifier is forwarded to the meter 42 and marker 44. Because the packet has already been classified and processed by the meter 42 and marker 44 at the ingress switching node, the packet may be simply forwarded to the receiving node's shaper/dropper 46, which forwards the packet to the buffer's queuing mechanism.

The queuing mechanism compares the filling level of the non-congestion area of the queue in its buffer 50 against the congestion watermark for determining whether the packet should be stored in the queue, and if so, whether the packet should be stored in the congestion or non-congestion area of the queue. A stored packet is then forwarded to a next hop.

Figure 3:
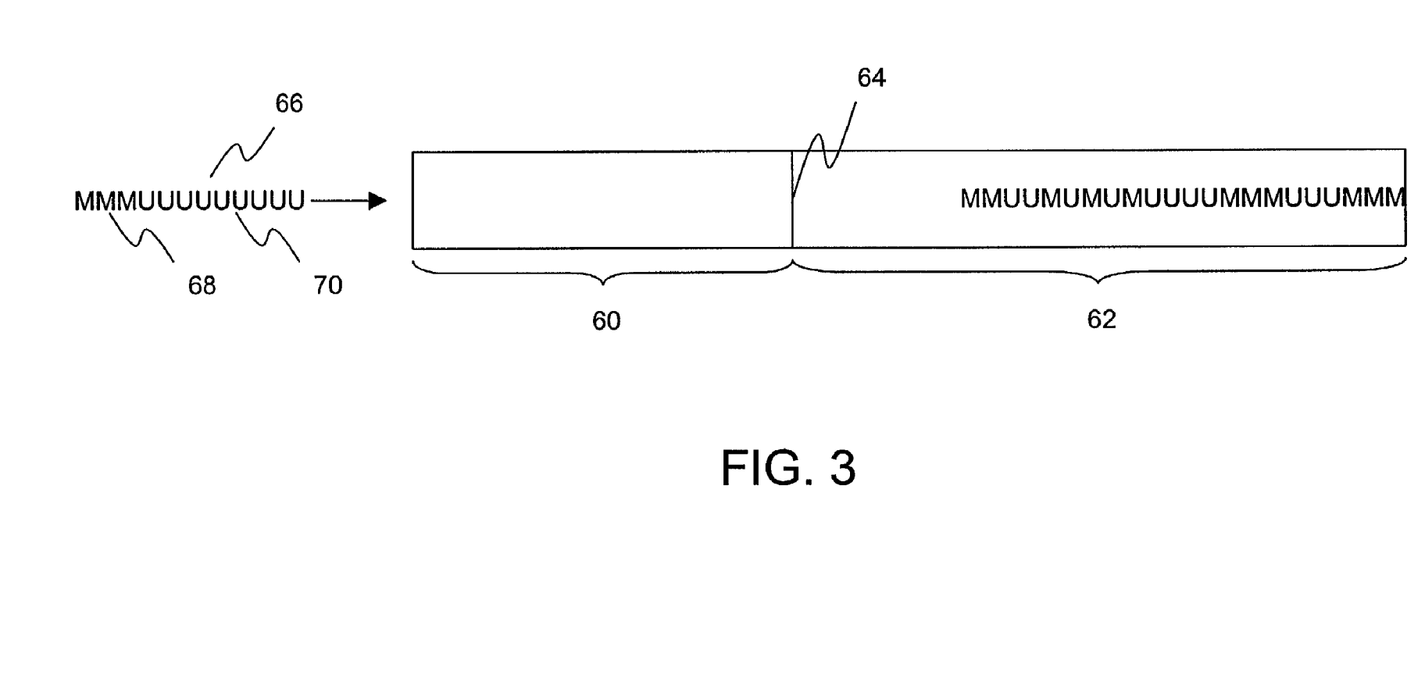
FIG. 3 is a schematic layout diagram of an oversubscribed buffer queue according to one embodiment of the invention.

FIG. 3 is a schematic layout diagram of an oversubscribed queue in the buffer 50 of a particular node according to one embodiment of the invention. Inbound packets 66 from different oversubscribed LSPs traversing the node enter the queue either marked (M) 68 or unmarked (U) 70. The packets are then multiplexed in the same oversubscribed queue.

The queue includes a non-congestion area 62 for storing the marked and unmarked packets during periods of non-congestion and a congestion area 60 for storing unmarked packets during periods of congestion. A congestion watermark 64 demarcates the boundaries of the non-congestion area 62 from the congestion area 60, and indicates when congestion is present.

According to one embodiment of the invention, the congestion watermark 64 is positioned to give the non-congestion area 62 the sum of the CRs of the different oversubscribed LSPs traversing the node plus a percentage of the sum of their ERs. The congestion area is dimensioned as the sum of the CRs of the different oversubscribed LSPs traversing the node. Upon configuring a new LSP or IP tunnel traversing a particular node, the congestion watermark for the node's queue is modified accordingly to based on the new LSP's CR and ER values.

When the sum of the total marked an unmarked traffic from the different LSPs are below the congestion watermark 64, the traffic is stored in the non-congestion area 62 of the queue. When the congestion watermark 64 is reached, the unmarked traffic presented to the queue is stored in the congestion area 60. The traffic marked as being suitable for discarding are discarded to protect the CR traffic.

Figure 4A:
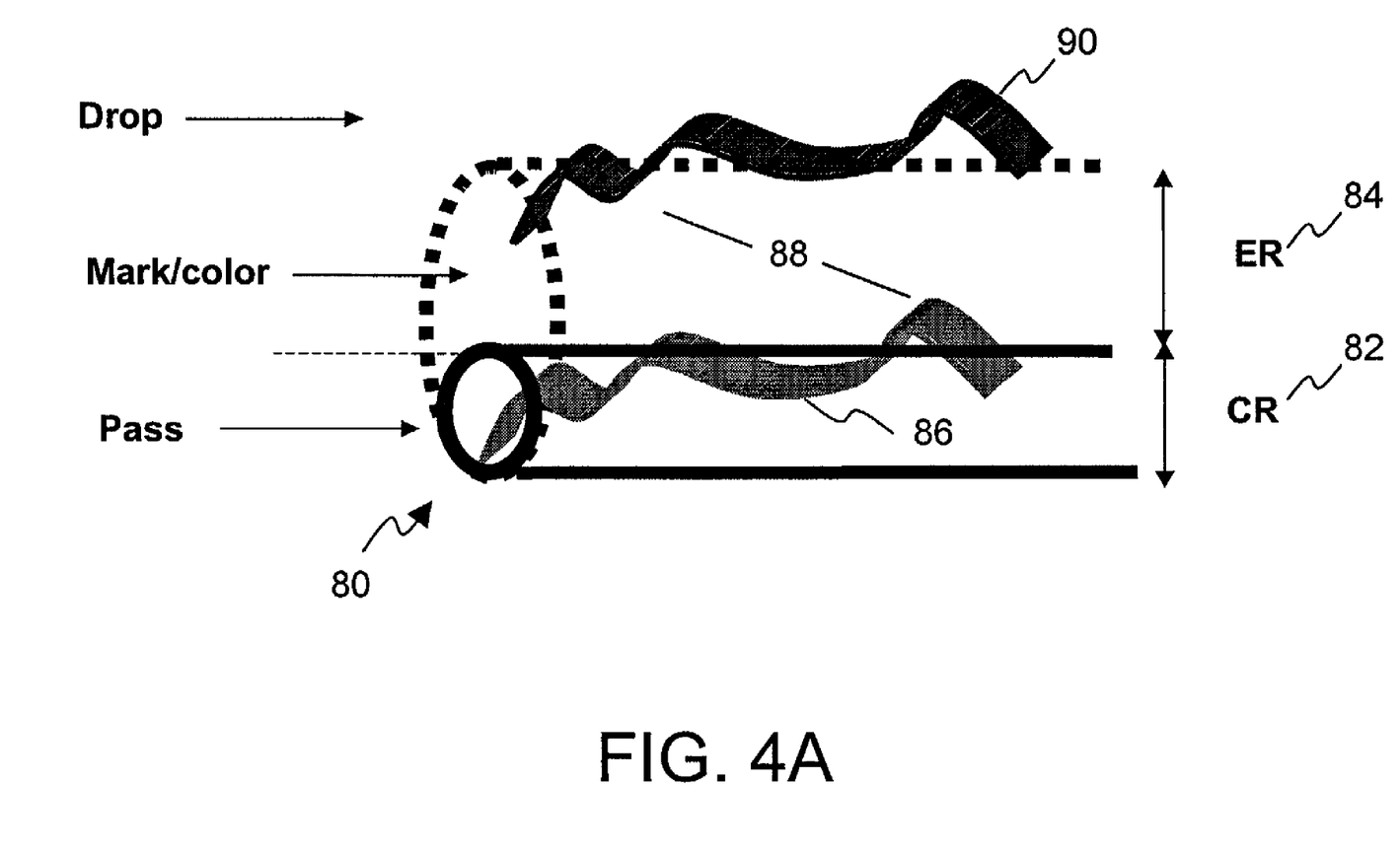
FIG. 4A illustrates the policing and marking of traffic entering an oversubscribed LSP pipe according to one embodiment of the invention.

FIG. 4A illustrates the policing and marking of traffic entering an oversubscribed LSP pipe with a reserved CR bandwidth and an additional ER bandwidth 84 according to one embodiment of the invention. Traffic 86 transmitted within the CR bandwidth 82 is admitted by the ingress node 14 and passed to a next hop. Traffic 88 transmitted within the CR+ER bandwidth is marked as being suitable for being discarded. Traffic 90 that exceeds the CR+ER bandwidth is dropped.

Figure 4B:
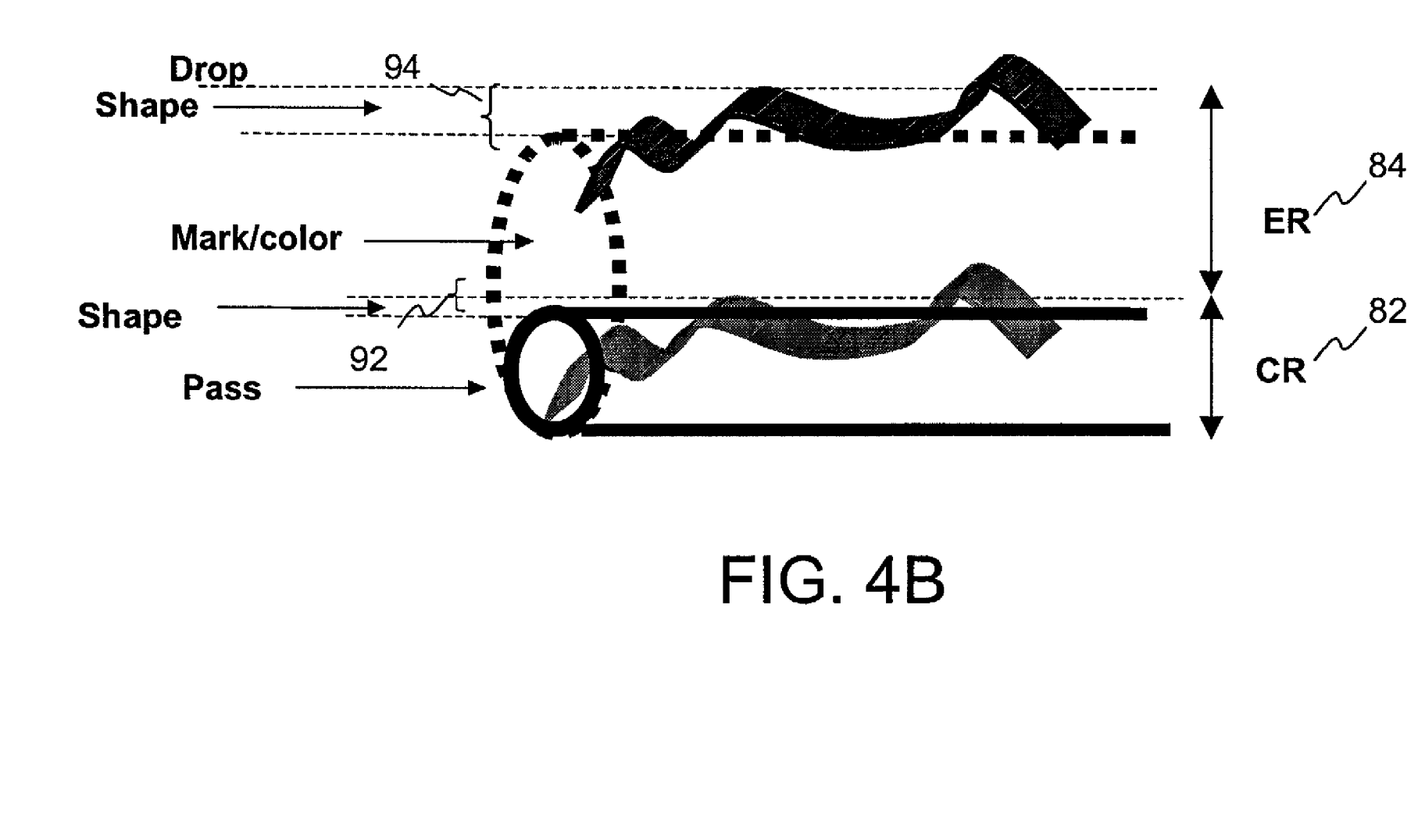
FIG. 4B illustrates the policing and marking of traffic entering an oversubscribed LSP pipe according to an alternative embodiment of the invention.

FIG. 4B illustrates the policing and marking of traffic according to an alternative embodiment of the invention. According to this alternative embodiment, both the CR 82 and ER 84 bandwidth may take into account a burst rate that is sometimes provided to shape traffic within the burst rate. Accordingly, traffic within a burst rate 92 for the CR traffic 82 is shaped in a conventional manner instead of being marked for discarding. Similarly, traffic within a burst rate 94 for the ER traffic is shaped instead of being discarded.

Figure 5:
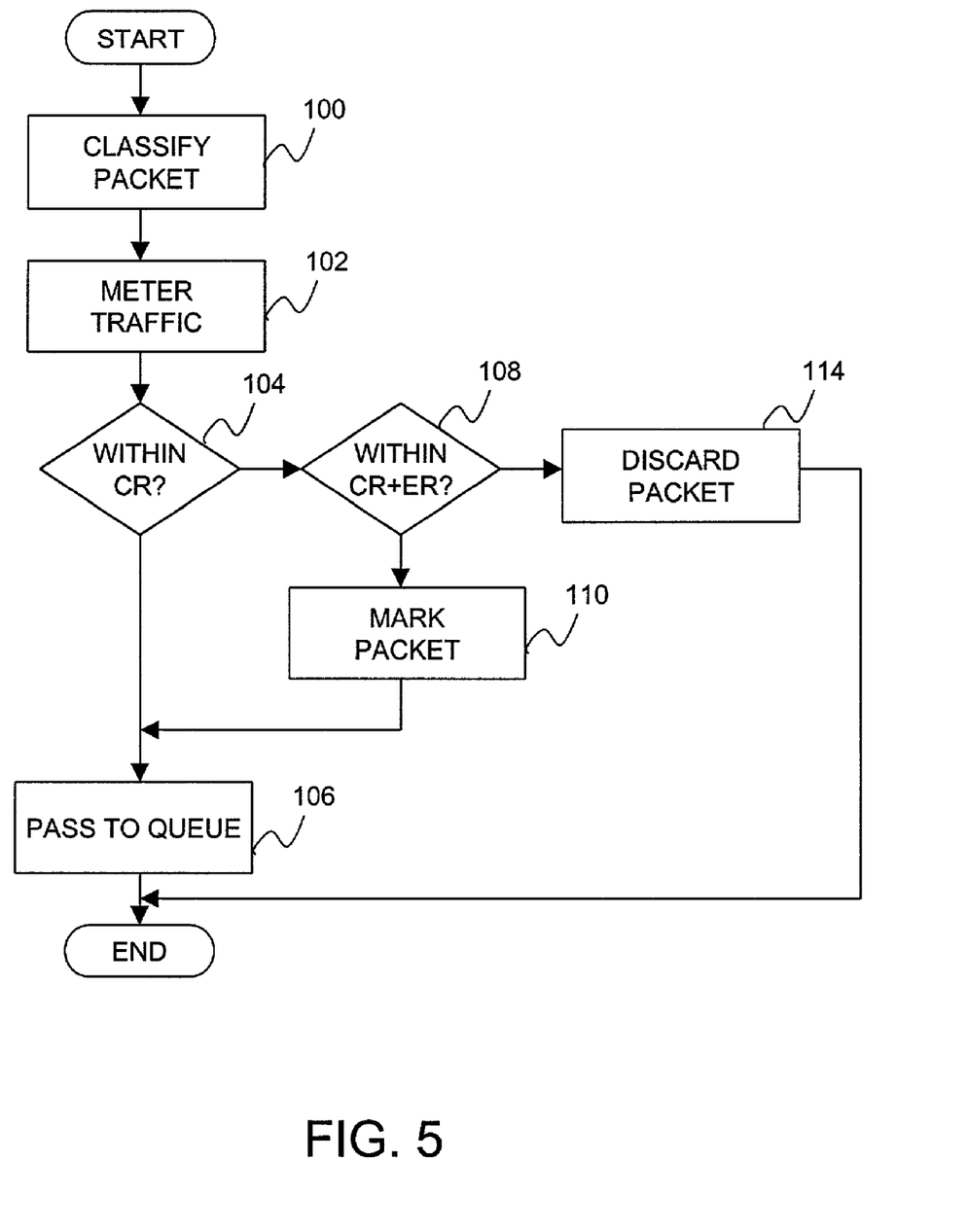
FIG. 5 is a flow diagram of a packet policing and marking process performed at an ingress switching node according to one embodiment of the invention.

FIG. 5 is a flow diagram of a packet policing and marking process performed at the ingress switching node 14 according to one embodiment of the invention. The process starts, and in step 100, an inbound packet is classified by the node's classifier 40. In step 102, the node's meter 42 computes the traffic rate in view of the new inbound packet. In step 104, the node's marker 44 proceeds to mark the packet based on the classification information and the metering information. In this regard, a determination is made as to whether the packet is within its CR. If the answer is YES, the packet is left unmarked and the shaper/dropper 46 proceeds to pass the packet for processing by the node's queuing mechanism. Alternatively, the packet is marked as being part of CR traffic prior to being passed to the queue.

If the packet is not transmitted within its CR, a determination is made in step 108 as to whether the packet is being transmitted within its CR+ER. If the answer is NO, packet is discarded in step 114. If the answer is YES, the packet is admitted, but marked in step 110 as being suitable for discarding if congestion occurs in the queues along the LSP pipe. In step 112, the marked packet is passed for processing by the node's queuing mechanism.

Figure 6:
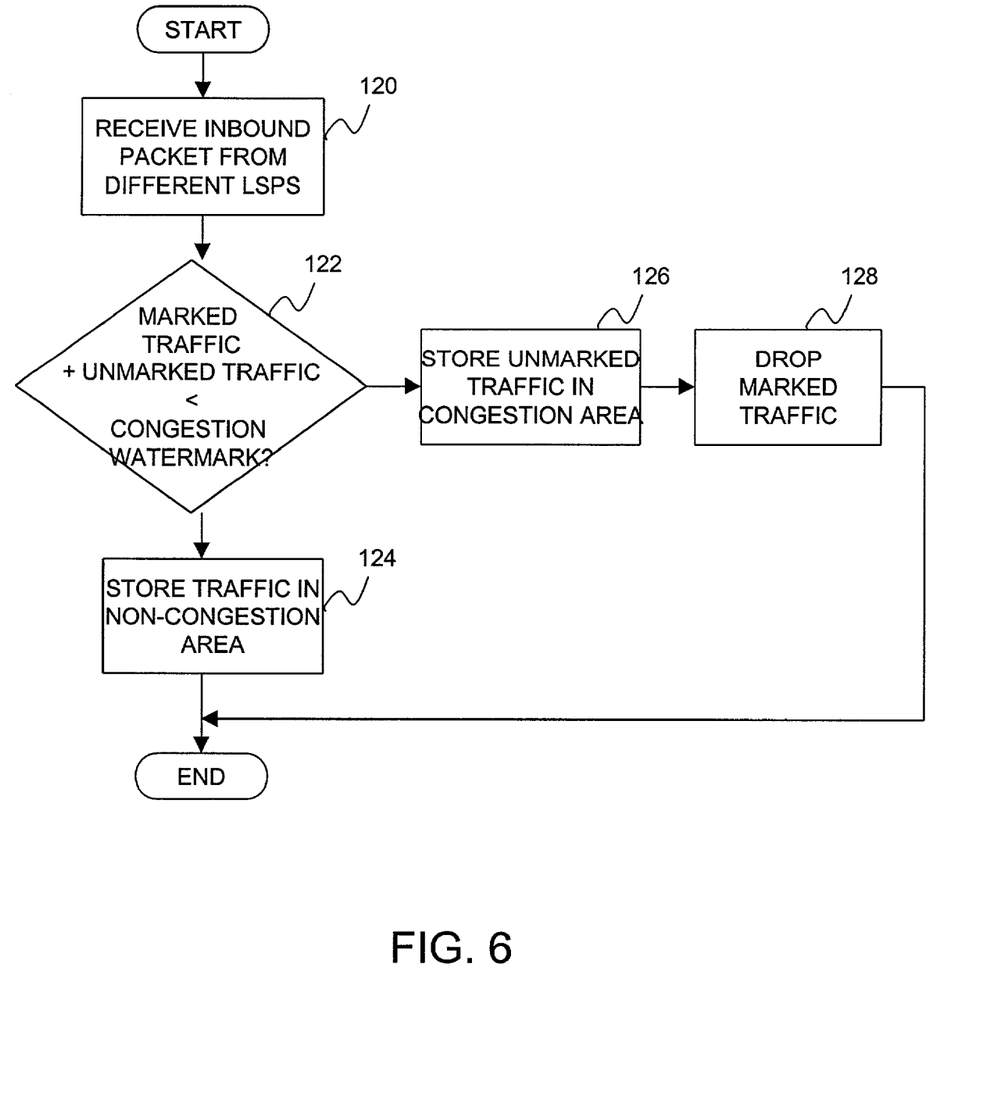
FIG. 6 is a flow diagram of a packet queuing mechanism according to one embodiment of the invention.

FIG. 6 is a flow switching diagram of a queuing mechanism employed by the buffer 50 in each node of the LSP pipe according to one embodiment of the invention. The queuing mechanism may be implemented in hardware, software, and/or middleware according to conventional mechanisms.

In step 120, the buffer receives inbound traffic from different LSPs traversing the node. In step 122, a determination is made as to whether the sum of the marked and unmarked traffic is less than the congestion watermark. If the answer is YES, the buffer 50, in step 124, stores the traffic in the non-congestion area of the queue.

If the answer is NO, the buffer protects the CR traffic and stores, in step 126, the unmarked traffic in the congestion area of the queue. The marked traffic is discarded in step 128.

Although this invention has been described in certain specific embodiments, those skilled in the art will have no difficulty devising variations which in no way depart from the scope and spirit of the present invention. For example, although all of the embodiments relate to a congestion control mechanism for an LSP, a person skilled in the art should recognize that the described congestion control mechanism may be applied to any other IP tunneling technology conventional in the art such as, for example, L2TP.

It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

We claim:

1. A method for controlling network traffic in a data communication network, the method comprising:
    receiving an inbound packet from an inbound traffic flow;
    identifying the packet as a first profile packet if the packet conforms to a first subscribed bandwidth;
    identifying the packet as a second profile packet if the packet does not conform to the first subscribed bandwidth and conforms to a second subscribed bandwidth; and
    storing first profile packets in a first area of a queue reserved for first profile packets during periods of congestion.

2. The method of claim 1, wherein the packet is retained if the packet is identified as a first profile packet.

3. The method of claim 1, wherein the packet is retained if the packet is identified as a second profile packet during periods of no congestion.

4. The method of claim 1, wherein the packet is discarded if the packet is identified as a second profile packet during periods of congestion.

5. The method of claim 1, wherein the packet is discarded if the packet is not identified as either a first profile packet or a second profile packet.

6. The method of claim 1, wherein the first subscribed bandwidth is a committed bandwidth.

7. The method of claim 1, wherein the second subscribed bandwidth is a conditional bandwidth.

8. The method of claim 1, further comprising storing first profile and second profile packets in a second area of a queue during periods of no congestion.

9. The method of any of claims 3, 4, or 8, wherein congestion is determined based on available queuing capacity.

10. The method of claim 1 further comprising marking second profile packets as suitable for discarding.

11. A method for allocating excess bandwidth in a data communication network on a subscription basis, the method comprising:
    allocating a first subscribed bandwidth and a second subscribed bandwidth for a flow;
    receiving a first packet in the flow below the first subscribed bandwidth for the flow;
    receiving a second packet in the flow above the first subscribed bandwidth and below the second subscribed bandwidth for the flow;
    if congestion is detected, storing the first packet and discarding the second packet; and
    if no congestion is detected, storing the first packet and the second packet;
    if congestion is detected the first packet is stored in an area of a queue reserved for periods of congestion.

12. The method of claim 11, wherein if no congestion is detected the first packet and the second packet are stored in an area of a queue reserved for periods of non-congestion.

13. The method of claim 11, further comprising discarding a third packet in the flow in excess of the second subscribed bandwidth for the flow.

14. The method of claim 11, wherein congestion is determined based on available queuing capacity.

15. A method for controlling network traffic in a data communication network, the method comprising:
    signaling a traffic flow including a first subscribed bandwidth and second subscribed bandwidth through a data communication network;
    receiving a packet in the traffic flow;
    identifying the packet as a first profile packet if the packet conforms to the first subscribed bandwidth;
    storing first profile packets in a first area of a queue reserved for first profile packets during periods of congestion;
    identifying the packet as a second profile packet if the packet does not conform to the first subscribed bandwidth and conforms to the second subscribed bandwidth; and
    processing the packet in accordance with the result of profile identification.

16. The method of claim 15, wherein the packet is retained if the packet is identified as a first profile packet.

17. The method of claim 15, wherein the packet is retained if the packet is identified as a second profile packet during periods of no congestion.

18. The method of claim 15, wherein the packet is discarded if the packet is identified as a second profile packet during periods of congestion.

19. The method of claim 15, wherein the packet is discarded if the packet is not identified as either a first profile packet or a second profile packet.

20. The method of claim 15, wherein the first subscribed bandwidth is a committed bandwidth.

21. The method of claim 15, wherein the second subscribed bandwidth is a conditional bandwidth.

22. The method of claim 15, further comprising storing first profile and second profile packets in a second area of a queue during periods of no congestion.

23. A method for controlling network traffic in a data communication network, the method comprising:

receiving an inbound packet;

identifying the packet as a first profile packet if the packet conforms to a first bandwidth;

identifying the packet as a second profile packet if the packet does not conform to the first bandwidth and conforms to a second bandwidth;

determining whether congestion is present or absent;

admitting the packet to a non-congestion area of a queue if congestion is determined to be absent;

admitting the packet to a congestion area of a queue if congestion is determined to be present and the packet is identified as a first profile packet; and dropping the packet if congestion is determined to be present and the packet is identified as a second profile packet.

24. The method of claim 23, wherein the admitting step comprises the substep of queuing the packet.

* * * * *